(12) United States Patent
Saito

(10) Patent No.: US 7,277,681 B2
(45) Date of Patent: Oct. 2, 2007

(54) INTERROGATOR OF MOVING BODY IDENTIFICATION DEVICE

(75) Inventor: Takeshi Saito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 198 days.

(21) Appl. No.: 10/519,564

(22) PCT Filed: Aug. 1, 2002

(86) PCT No.: PCT/JP02/07853

§ 371 (c)(1),
(2), (4) Date: Dec. 30, 2004

(87) PCT Pub. No.: WO2004/013652

PCT Pub. Date: Feb. 12, 2004

(65) Prior Publication Data

US 2005/0205676 A1    Sep. 22, 2005

(51) Int. Cl.
*H03C 1/52*    (2006.01)
(52) U.S. Cl. .................. 455/108; 455/556.1; 455/344; 455/572; 340/10.1; 340/10.2; 340/10.3; 340/10.5; 340/572.4; 342/44; 342/193; 375/300; 375/268
(58) Field of Classification Search ............ 455/556.1, 455/344, 557, 572, 88, 108, 98, 69; 340/10.1–10.3, 340/572.4, 10.5; 342/44, 193; 375/300, 375/268

See application file for complete search history.

(56) References Cited

U.S. PATENT DOCUMENTS 4,068,232 A * 1/1978 Meyers et al. ................. 342/44
5,247,305 A * 9/1993 Hirata et al. ................... 342/44
5,929,779 A * 7/1999 MacLellan et al. ........ 340/10.2
5,952,922 A * 9/1999 Shober ..................... 340/572.4
6,946,950 B1 * 9/2005 Ueno et al. ................ 340/10.1

FOREIGN PATENT DOCUMENTS

| JP | 05-276099 | 10/1993 |
| JP | 10-271555 | 10/1998 |
| JP | 2000-278171 | 10/2000 |
| JP | 2001-231811 | 8/2001 |
| JP | 2001-338385 | 12/2001 |
| JP | 2002-046821 | 2/2002 |
| JP | 2002-073653 | 3/2002 |
| JP | 2002-083250 | 3/2002 |
| WO | WO 2004/013652 A1 | 2/2004 |

* cited by examiner

Primary Examiner—Edan Orgad
Assistant Examiner—Junpeng Chen
(74) Attorney, Agent, or Firm—Antonelli, Terry, Stout & Kraus, LLP.

(57) ABSTRACT

To reduce the size, weight and cost of an interrogator which is included in an RFID system and required to have a high output power, the interrogator for transmitting a signal shares a radio wave source or a power supply with a portable wireless terminal such as a mobile phone or a portable communication device. For this purpose, a radio frequency transmitter signal is subjected to amplitude modulation by information to be transmitted to a transponder. Furthermore, part of the radio frequency transmitter signal extracted using a coupler is used to perform synchronous detection on a radio frequency receiver signal returned from the transponder, and data coming from the transponder are extracted.

9 Claims, 8 Drawing Sheets

INTERROGATOR OF MOVING BODY IDENTIFICATION DEVICE

CROSS REFERENCE TO RELATED APPLICATION

This application is a 371 application of PCT/JP2002/007853, filed Aug. 1, 2002, the entirety of the contents and subject matter of all of the above is incorporated herein by reference.

TECHNICAL FIELD

The present invention relates to an interrogator which, together with a transponder, composes a radio frequency identification system and more particularly to transmitter and receiver circuit structure of the interrogator.

BACKGROUND ART

A radio frequency identification system (hereinafter referred to as an "RFID"), together with an interrogator and plural transponders (radio tags), makes up a radio communication system. In Japan, a standard for RFIDs has been established as a standard of ARIB (Association of Radio Industries and Businesses).

A configuration of an RFID system is shown in FIG. 8. A transponder 12 obtains a direct-current (DC) power supply (PS) required to drive internal circuits by rectifying at a detector circuit (DET) 14 a radio frequency power (radio waves) such as microwaves received from a transmitter circuit (Tx) 5 of an interrogator 1 via a transmitter antenna 3 and an antenna 13. At the same time, the transponder 12 extracts a clock signal (information) included in the radio frequency power and supplies both the clock signal and the DC power supply to a logic circuit (LOGIC) 15 and a memory circuit (MEM) 16 thereby letting the two circuits operate.

The logic circuit 15 having received the clock signal and started logic operation reads out relevant data from the memory circuit 16 and sends the data to the detector circuit 14. The detector circuit 14 using the data read out from the memory circuit 16 as a modulation signal subjects the radio frequency power received by the antenna 13 to modulation such as amplitude modulation. The modulated radio frequency power is radiated from the antenna 13 back to the interrogator 1.

The radio waves returned to the interrogator 1 are received by a receiver antenna 2 and are sent to a receiver circuit (Rx) 4 for data extraction. In this manner, data stored in the transponder 12 is transmitted to the interrogator 1.

There are cases in which the logic circuit 15 is caused to read out data from the memory circuit 16 when the logic circuit 15 reads a read command signal transmitted, along with the clock signal, as the information by the interrogator 1.

When data is written from the interrogator 1 to the memory circuit 16 of the transponder 12, a procedure similar to the above procedure is used. For the above write operation, in addition to the clock signal, a read/write command signal is also transmitted as the information to the transponder 12. Normally, in a system like this, the interrogator 1 is operated under the control of a controller (CONT) 6 connected via a communication path 7.

The interrogator 1 that supplies power to the transponder 12 using radio waves and also reads out data is permitted by the standard to radiate radio waves with a radio frequency power of 300 mW in a proximity remote coupling RFID system or with a radio frequency power of 10 mW in a close coupling or proximity coupling RFID system.

When a radio frequency output of as large as 300 mW is required in such an RFID system, the power consumption of the interrogator circuit as a whole reaches nearly 2 W. Hence, it need hardly be said that a large power supply is inevitably required even if the interrogator operation is limited to only when making communications. In the case of a battery-operated handy interrogator, a large-size battery will be required to secure such a large power supply capacity, making it difficult to reduce the size, weight and cost of an interrogator. In the case of a close coupling low-power interrogator, too, a battery power supply will be required inevitably making the interrogator heavy and expensive.

DISCLOSURE OF INVENTION

A purpose of the present invention is to provide a handy interrogator which is realized to be compact, light and inexpensive.

An interrogator included in an RFID system finishes transmitting data to and reading data from a transponder in a short period of time (up to 400 ms, for example). In the case of a portable wireless terminal such as a mobile phone or a general handheld communication device, a wave deformation lasting for such a short period of time during transmission mode is tolerable. As for the transmission power of a mobile phone, it is normally about 800 mW.

The present invention has been made taking note of the above points of view. The interrogator of the present invention to realize the above purpose is characterized in that the interrogator subjects, during transmission mode of a portable wireless terminal, a radio frequency transmitter signal of the portable wireless terminal to amplitude modulation by information to be transmitted to a transponder, radiates radio waves of the amplitude-modulated signal from an antenna of the portable wireless terminal to the transponder, receives radio waves returned from the transponder with the antenna of the portable wireless terminal, and reads out data from the received signal. The interrogator having no power supply to operate its internal circuits depends on the driving power supply of the portable wireless terminal in which the interrogator is incorporated. The present invention makes both a signal source for radio wave transmission from the interrogator to the transponder and a power supply for the interrogator's internal circuits available from the portable wireless terminal, enabling the realization of a smaller, lighter and more inexpensive interrogator.

Another interrogator according the present invention is characterized in that the interrogator receives a radio frequency transmitter signal radiated from an antenna of a portable wireless terminal in transmission mode with an antenna of the interrogator, obtains a power supply by rectifying the received signal, subjects the received signal to amplitude modulation by information to be transmitted to a transponder, radiates radio waves of the amplitude-modulated signal from another antenna of the interrogator to the transponder, receives radio waves returned from the transponder with the another antenna of the interrogator and reads out data from the received signal. The present invention makes both a signal source for radiowave transmission from the interrogator to the transponder and a power supply for the interrogator's internal circuits available from the portable wireless terminal, enabling the realization of a smaller, lighter and more inexpensive interrogator.

Still another interrogator according to the present invention is characterized in that the interrogator receives a radio frequency transmitter signal radiated from an antenna of a portable wireless terminal in transmission mode with an antenna of the interrogator, obtains a power supply by rectifying the received signal, subjects a signal generated by an oscillator provided for the interrogator to amplitude modulation by information to be transmitted to a transponder, radiates radio waves of the amplitude-modulated signal from another antenna of the interrogator to the transponder, receives radio waves returned from the transponder with the another antenna of the interrogator and reads out data from the received signal. The present invention makes a power supply for the interrogator's internal circuits available from the portable wireless terminal, enabling the realization of a smaller, lighter and more inexpensive interrogator.

BEST MODE FOR CARRYING OUT THE INVENTION

Figure 1:
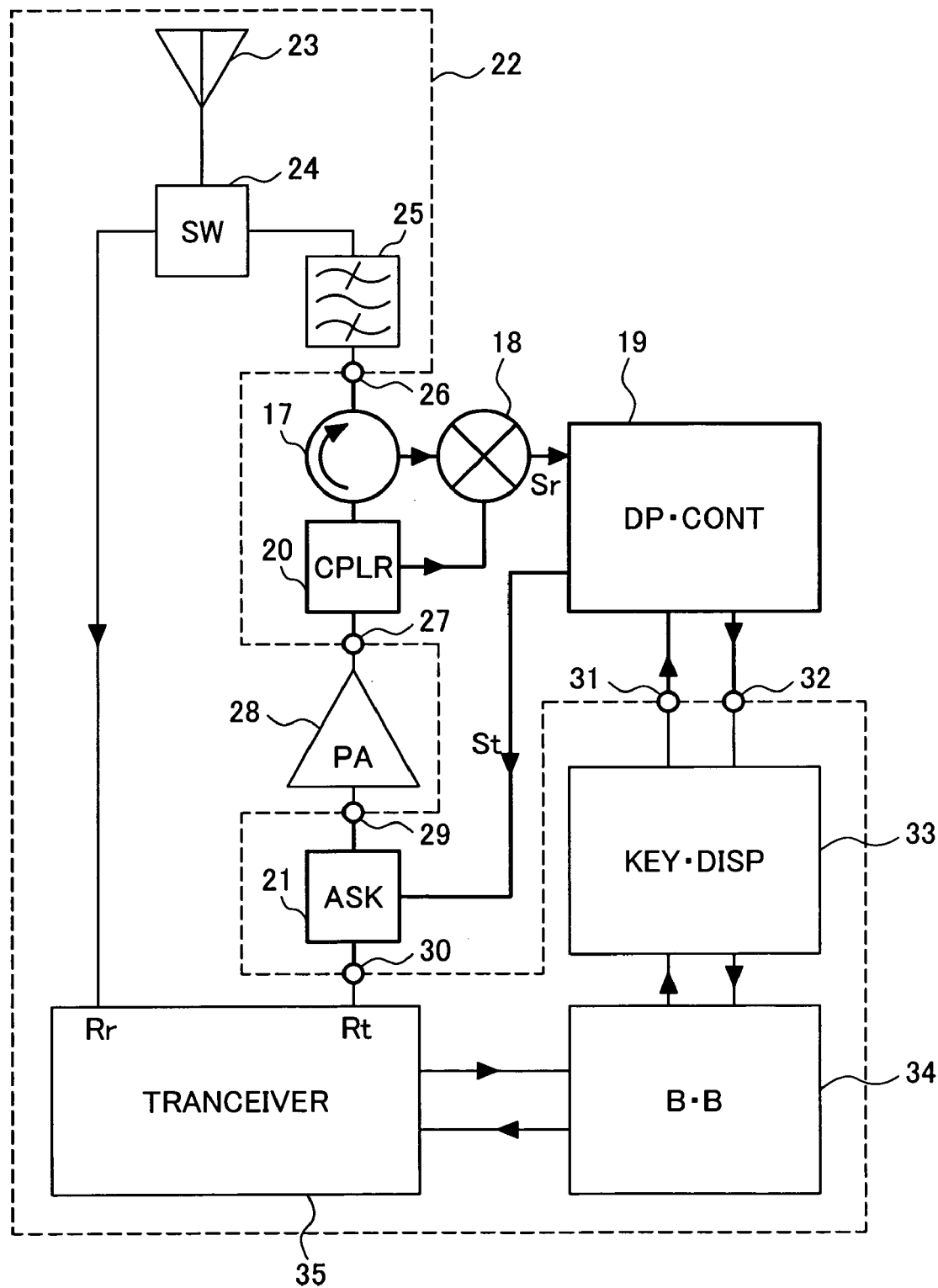
FIG. 1 is a block diagram for explaining a first embodiment of an interrogator according to the present invention.

An interrogator according to the present invention will be described in more detail with reference to the accompanying drawings showing plural embodiments of the present invention. Note that the reference numerals and symbols common among FIGS. 1 to 6 denote the identical or similar objects, respectively.

FIG. 1 shows a circuitry of a first embodiment of the present invention. In FIG. 1, a reference numeral 19 denotes a data processing/controlling circuit of an interrogator of an RFID system. The data processing/controlling circuit (DP•CONT) 19 generates information St to be transmitted to a transponder of the RFID system and inputs data Sr from the transponder. A reference numeral 22 also shown in FIG. 1 denotes a mobile phone to which the interrogator is coupled.

The mobile phone 22 has a transmitter/receiver circuit (transceiver) 35 for generating a radio frequency transmitter signal Rt, and inputting a radio frequency receiver signal Rr, a power amplifier (PA) 28 for power-amplifying the radio frequency transmitter signal Rt, a band pass filter (BPF) 25 for removing unwanted signal portions of the power-amplified radio frequency transmitter signal Rt and a transmission/reception changeover switch 24 for switching between the radio frequency transmitter signal Rt to be transmitted to an antenna 23 and the radio frequency receiver signal Rr to be received from the antenna 23.

In the present embodiment, an ASK (Amplitude Shift Keying) modulation circuit 21 which subjects the radio frequency transmitter signal Rt to amplitude modulation using the information St is connected between the transmitter/receiver circuit 35 and the power amplifier 28, and a coupler (CPLR) 20 and a circulator 17 for extracting part of the power-amplified radio frequency transmitter signal Rt are connected in series between the power amplifier 28 and the band pass filter 25. A mixer 18 which performs synchronous detection on a signal from the circulator 17 using the radio frequency transmitter signal Rt from the coupler 20 as a carrier is also provided.

Furthermore, a connection terminal 26 is provided between the circulator 17 and the band pass filter 25, a connection terminal 27 between the coupler 20 and the power amplifier 28, a connection terminal 29 between the power amplifier 28 and the ASK modulation circuit 21, and a connection terminal 30 between the ASK modulation circuit 21 and the transmitter/receiver circuit 35.

The circulator 17 transmits the radio frequency transmitter signal Rt received from the power amplifier 28 to the transmission/reception changeover switch 24 via the band pass filter 25. The radio frequency transmitter signal Rt transmitted to the transmission/reception changeover switch 24 is radiated as radio waves from the antenna 23.

The radio frequency transmitter signal Rt radiated as radio waves, i.e., the signal transmitted by the mobile phone 22 in transmission mode having been subjected to amplitude modulation in the ASK modulation circuit 21 by the interrogator's information St can convey the interrogator's information St to the transponder. In addition, the radio waves radiated from the antenna 23 can also have a radio frequency power which can be used as a power supply for the transponder.

When the transponder is located nearby, radio waves returned from the transponder are received by the antenna 23. The received signal is led to the circulator 17 and then to the mixer 18. At the mixer 18, the received signal is subjected to synchronous detection causing the data Sr transmitted from the transponder to be outputted by the mixer 18. The data Sr outputted by the mixer 18 is sent to the data processing/controlling circuit 19.

As described above, when the coupler 20, the circulator 17 and the mixer 18 are connected to the mobile phone 22 via the connection terminals 26 and 27 and the ASK modulation circuit 21 is connected to the connection terminals 29 and 30, the mobile phone 22 in transmission mode can perform the function of an interrogator for an RFID system. In other words, such circuits of the mobile phone 22 as a portion used to generate the radio frequency transmitter signal Rt of the transmitter/receiver circuit 35, the power amplifier 28, the band pass filter 25, the transmission/reception changeover switch 24 and the antenna 23 are shared with the interrogator as a transmitter/receiver section.

The transmitter/receiver circuit 35 is connected to a base band circuit (B•B) 34 which has a keying/display section (KEY•DISP) 33. The keying/display section 33 is used also for the interrogator. It is connected to the data processing/controlling circuit 19 via the connection terminals 31 and 32.

The mixer 18, the ASK modulation circuit 21 and the data processing/controlling circuit 19 have a DC power supplied from a power supply (not shown) of the mobile phone 22.

Generally, in an interrogator, its power amplifier consumes the most power. In the present embodiment, the interrogator shares a power amplifier with the mobile phone 22 so that not so much power is additionally required for the interrogator. Hence, the interrogator can be easily built into the mobile phone 22.

Figure 2:
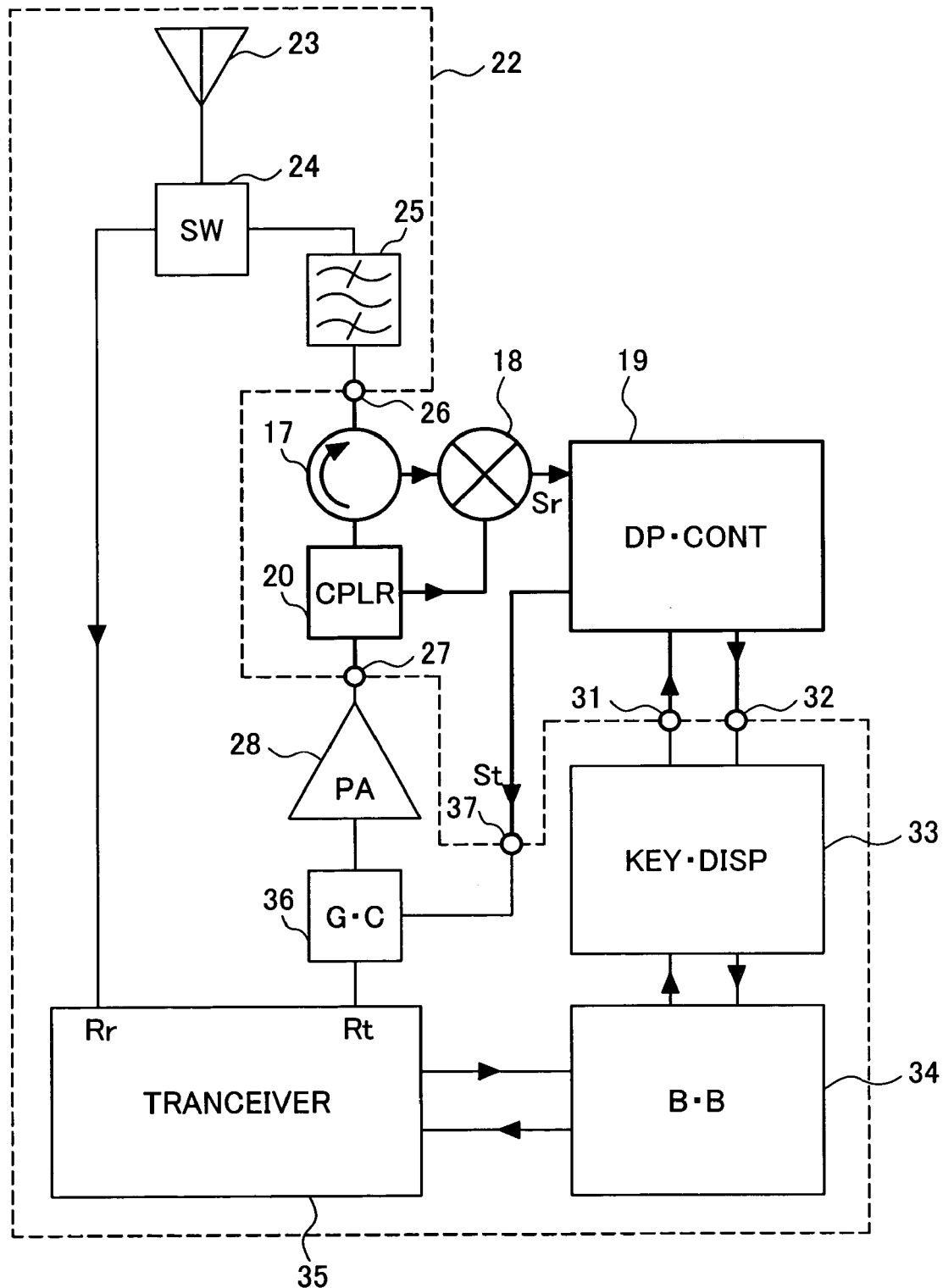
FIG. 2 is a block diagram for explaining a second embodiment of the interrogator according to the present invention.

FIG. 2 shows a circuit structure of a second embodiment of the present invention. In FIG. 2, a reference numeral 36 denotes a gain control system (G/C) included in the transmitter/receiver circuit 35 of the mobile phone 22. In the present embodiment, the gain control system 36 is directly connected to the power amplifier 28; the ASK modulation circuit 21 is not used.

The gain control system 36 is capable of gain control by the use of a control signal. In the present embodiment, the information St generated in the data processing/controlling circuit 19 is used as the control signal. The information St is sent to the gain control system 36 via a connection terminal 37.

In the above arrangement, the radio frequency transmitter signal Rt is subjected to amplitude modulation by the information St so that the information St can be conveyed to the transponder as in the first embodiment. The circuit structure used in the present embodiment is simplified by not using the ASK modulation circuit 21.

Figure 3:
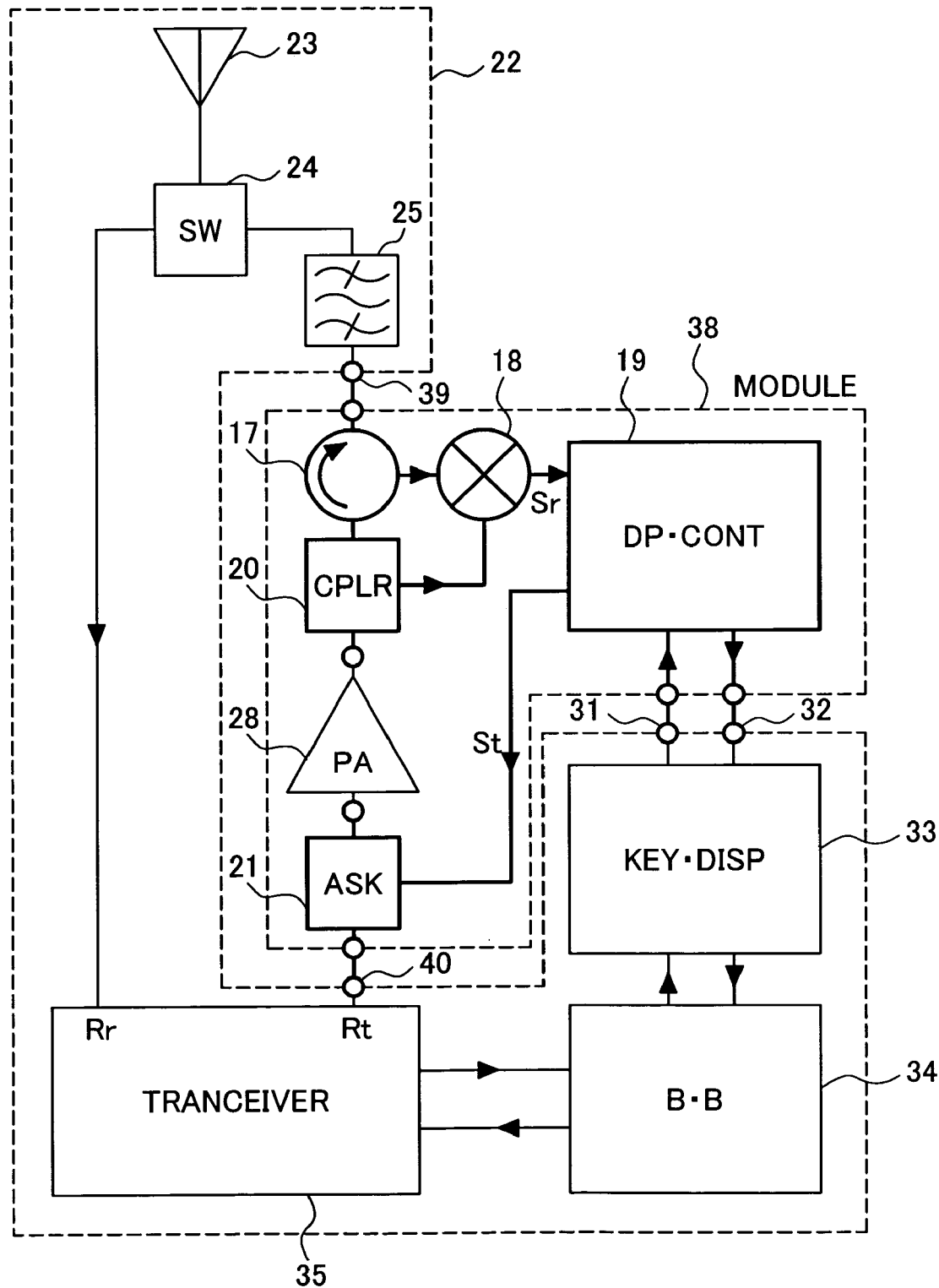
FIG. 3 is a block diagram for explaining a third embodiment of the interrogator according to the present invention.

FIG. 3 shows a circuitry of a third embodiment of the present invention. In FIG. 3, a reference numeral 38 denotes an interrogator circuit module composed of the circulator 17, the mixer 18, the data processing/controlling circuit 19, the coupler 20, the power amplifier 28 and the ASK modulation circuit 21 arranged on a single circuit board to make up a unified structure. The circuit module 38 is connected to the mobile phone 22 via connection terminals 39, 40, 31 and 32. In other respects, the present embodiment uses the same arrangement as used in the first embodiment.

The present embodiment by using the circuit module 38 having a unified structure makes it easy to incorporate the interrogator into the mobile phone 22 while also enabling the mobile phone 22 incorporating the interrogator to be made smaller in size and lower in production cost. It is also possible to arrange the circuits that make up the circuit module 38 into an IC (Integrated Circuit). Using the circuit module 38 arranged on a single IC substrate will enable the mobile phone 22 incorporating the interrogator to be made further smaller.

Figure 4:
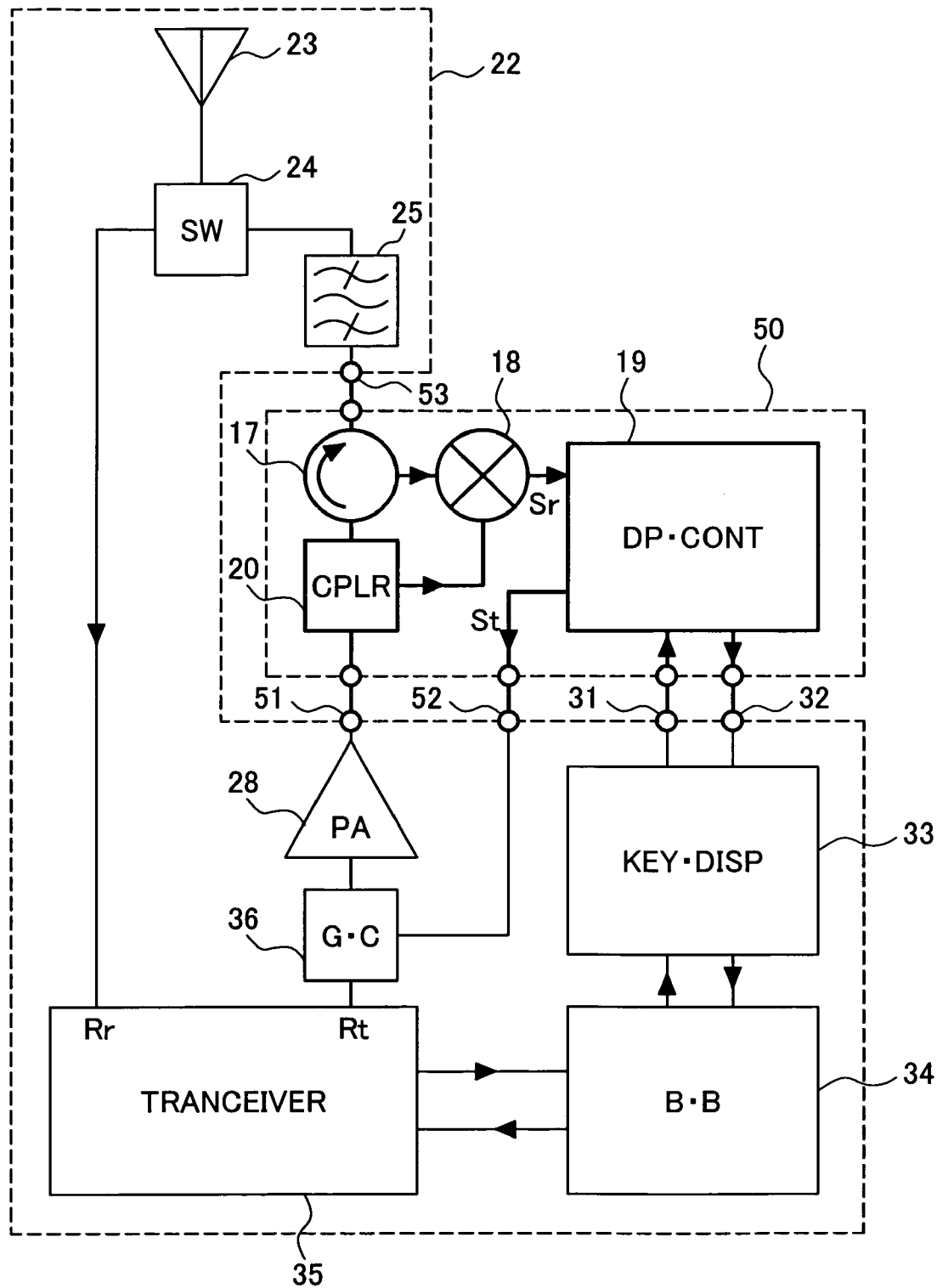
FIG. 4 is a block diagram for explaining a fourth embodiment of the interrogator according to the present invention.

FIG. 4 shows a circuit structure of a fourth embodiment of the present invention. In FIG. 4, a reference numeral 50 denotes an interrogator circuit module composed of the circulator 17, the mixer 18, the data processing/controlling circuit 19 and the coupler 20 arranged on a single circuit board to make up a unified structure. The circuit module 50 is connected to the mobile phone 22 via connection terminals 51 and 53 and the connection terminals 31 and 32. In other respects, the present embodiment uses the same arrangement as shown in FIG. 2.

The present embodiment by using the circuit module 50 having a unified structure makes it easy to incorporate the interrogator into the mobile phone 22 while also enabling the mobile phone 22 incorporating the interrogator to be made smaller in size and lower in production cost. It is also possible to arrange the circuits that make up the circuit module 38 into an IC (Integrated Circuit). Using the circuit module 50 arranged on a single IC substrate will enable the mobile phone 22 incorporating the interrogator to be made further smaller.

Figure 5:
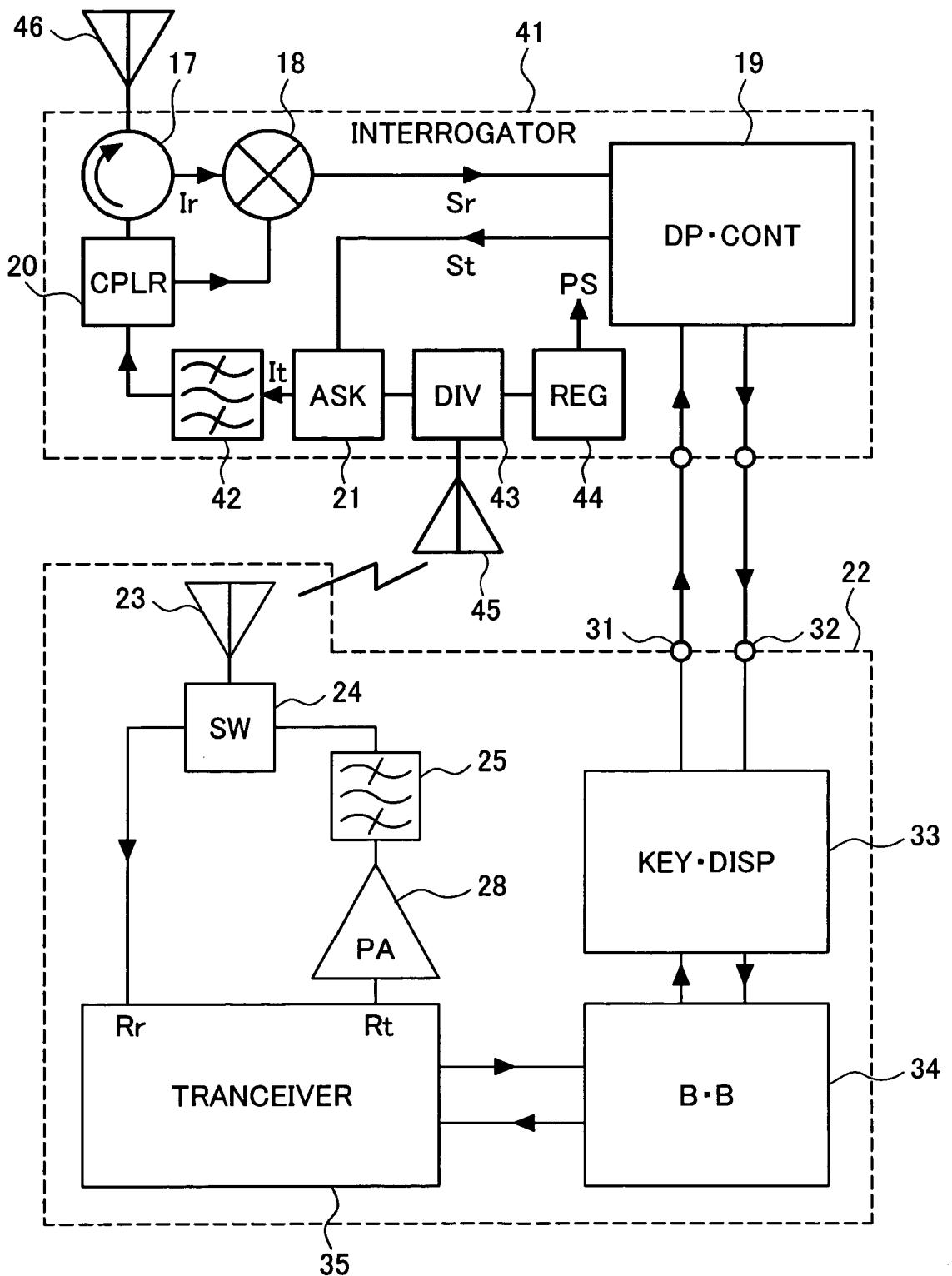
FIG. 5 is a block diagram for explaining a fifth embodiment of the interrogator according to the present invention.

FIG. 5 shows a circuit structure of a fifth embodiment of the present invention. In this embodiment, a power supply for an interrogator and a radio frequency transmitter signal to be transmitted from the interrogator to a transponder are obtained using the radio frequency transmitter signal Rt received by another antenna located near the antenna 23.

In FIG. 5, a reference numeral 41 denotes an interrogator according to the present embodiment, 45 the another antenna, 43 a divider which divides a signal received by the antenna 45 into two to proceed in two directions, 44 a rectifier which rectifies one of the divided signals from the divider 43 and outputs a power supply (PS), 42 a band pass filter which removes unwanted portions of a radio frequency transmitter signal It outputted by the ASK modulation circuit 21 of the interrogator 41, and 46 an antenna of the interrogator which radiates the radio frequency transmitter signal It coming via the coupler 20 and the circulator 17. The radio frequency transmitter signal It is obtained by subjecting the other of the divided signals from the divider 43 to amplitude modulation by the information St in the ASK modulation circuit 21. The power supply obtained from the rectifier 44 is supplied to all circuits of the interrogator 41 to drive the circuits.

For communication with the transponder, the interrogator radiates radio waves from the interrogator antenna 46. A signal received by the antenna 46 from a transponder, i.e., the radio frequency receiver signal Ir is sent to the mixer 18 via the circulator 17. The mixer 18 subjects the radio frequency receiver signal Ir to synchronous detection using the radio frequency transmitter signal It extracted in the coupler 20 and then outputs the data Sr transmitted from the transponder. The data Sr is processed in the data processing/controlling circuit 19.

The result of the data processing is, as required, sent to the keying/display section 33 of the mobile phone 22 for display via the connection terminals 31 and 32. Using functions of the mobile phone 22, the information displayed in the keying/display section 33 may be transmitted to a network to which the mobile phone 22 is linked or to another mobile phone for such processing as data identification, data storage or data comparison.

Figure 6:
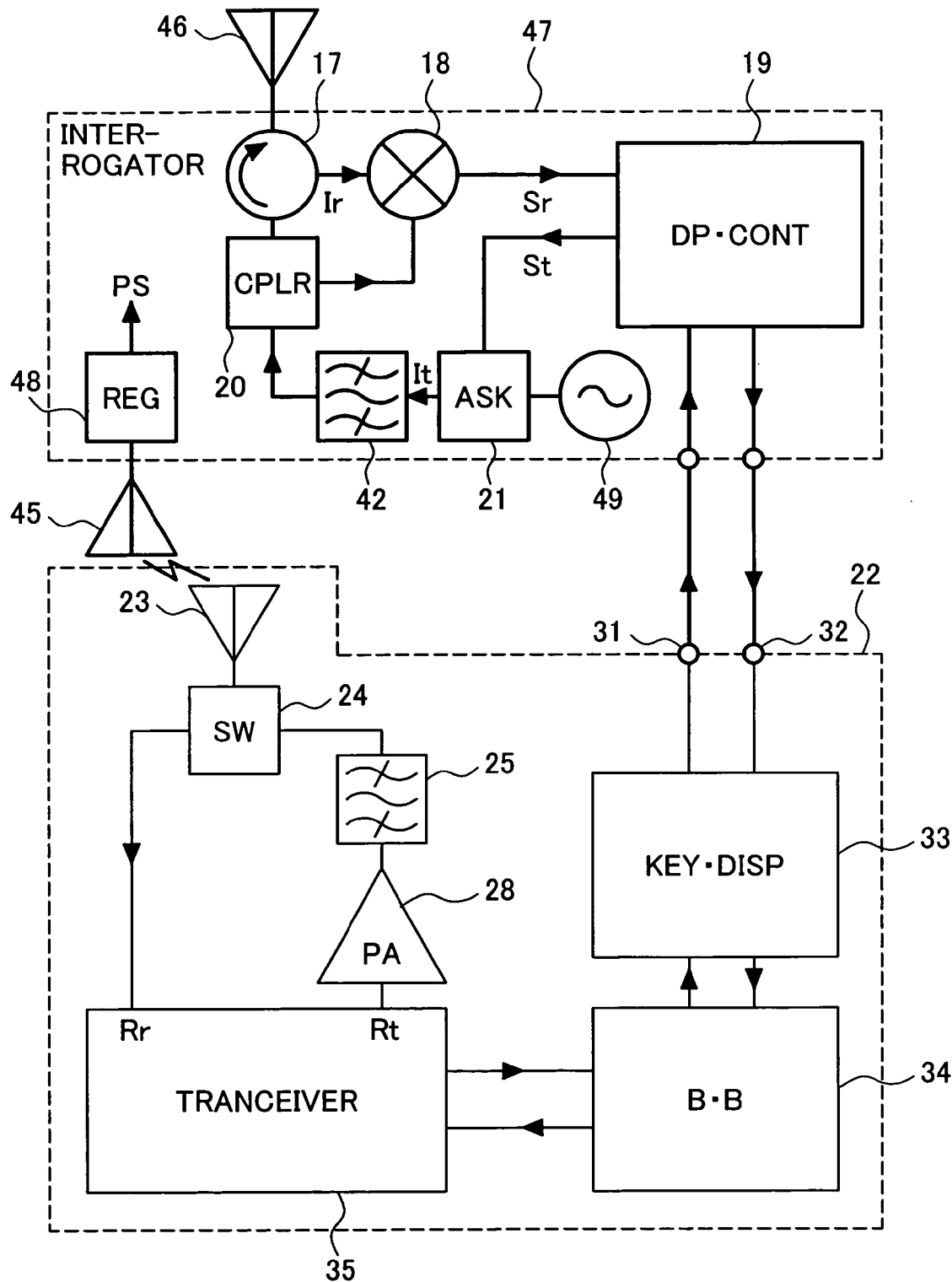
FIG. 6 is a block diagram for explaining a sixth embodiment of the interrogator according to the present invention.

FIG. 6 shows a circuit structure of a sixth embodiment of the present invention. In this embodiment, a power supply for an interrogator is, like in the fourth embodiment, obtained using the radio frequency transmitter signal Rt received by the antenna 45 located near the antenna 23, but, for the radio frequency transmitter signal It to be transmitted from the interrogator to a transponder, a carrier for the signal It is obtained from a local oscillator included in the interrogator.

In FIG. 6, a reference numeral 47 denotes an interrogator according to the present embodiment and 49 a local oscillator which generates a radio frequency signal. The signal generated by the local oscillator 49 is used as the carrier which is subjected to amplitude modulation by the information St in the ASK modulation circuit 21 to obtain the radio frequency transmitter signal It. While it is possible to set the frequency of the radio frequency signal generated by the local oscillator 49 to be approximately equal to the frequency of the radio frequency transmitter signal Rt of the mobile phone 22, the two frequencies need not necessarily be equal. The radio frequency signal generated by the local oscillator 49 may be set to be higher in frequency than the radio frequency transmitter signal Rt. Doing so allows using a smaller antenna and a smaller IC incorporating required circuits.

The radio frequency transmitter signal Rt received by the antenna 45 is sent, as it is, to a rectifier 48. A power supply from the rectifier 48 is supplied to all circuits, including the local oscillator 49, of the interrogator 47 to drive the circuits.

With respect to other circuit operations, the present embodiment is the same as the fourth embodiment so that the descriptions of such other circuit operations are omitted here. It is, of course, possible to perform, in the data processing/controlling circuit 19, error detection operation on the data Sr taken out from the mixer 18.

Figure 7A:
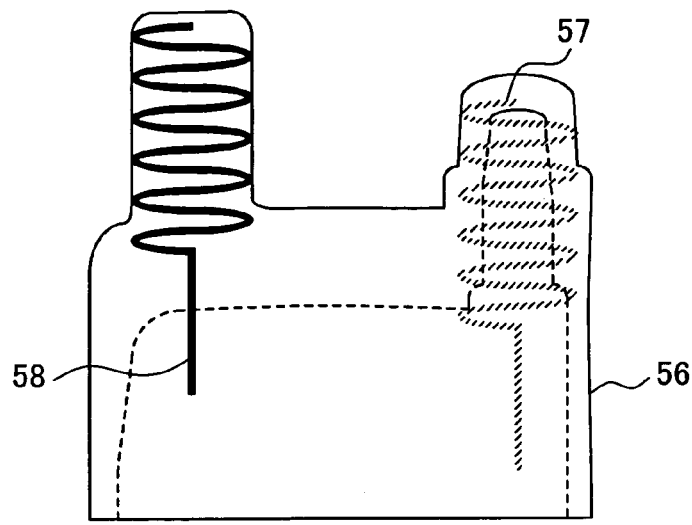
FIG. 7 is a diagram for explaining an example of antenna arrangement for an interrogator using a mobile phone.
Figure 7C:
Figure 7B:
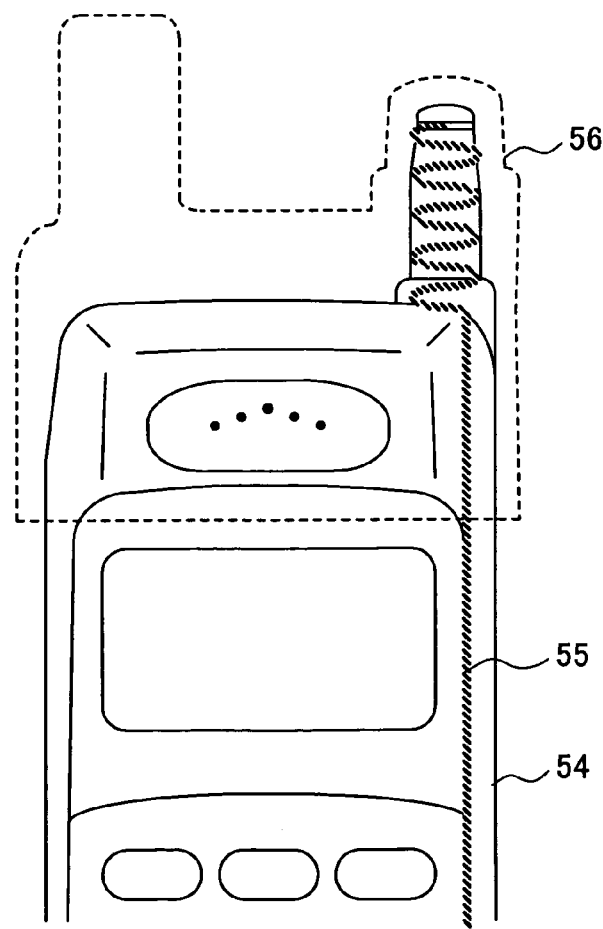
Figure 8:
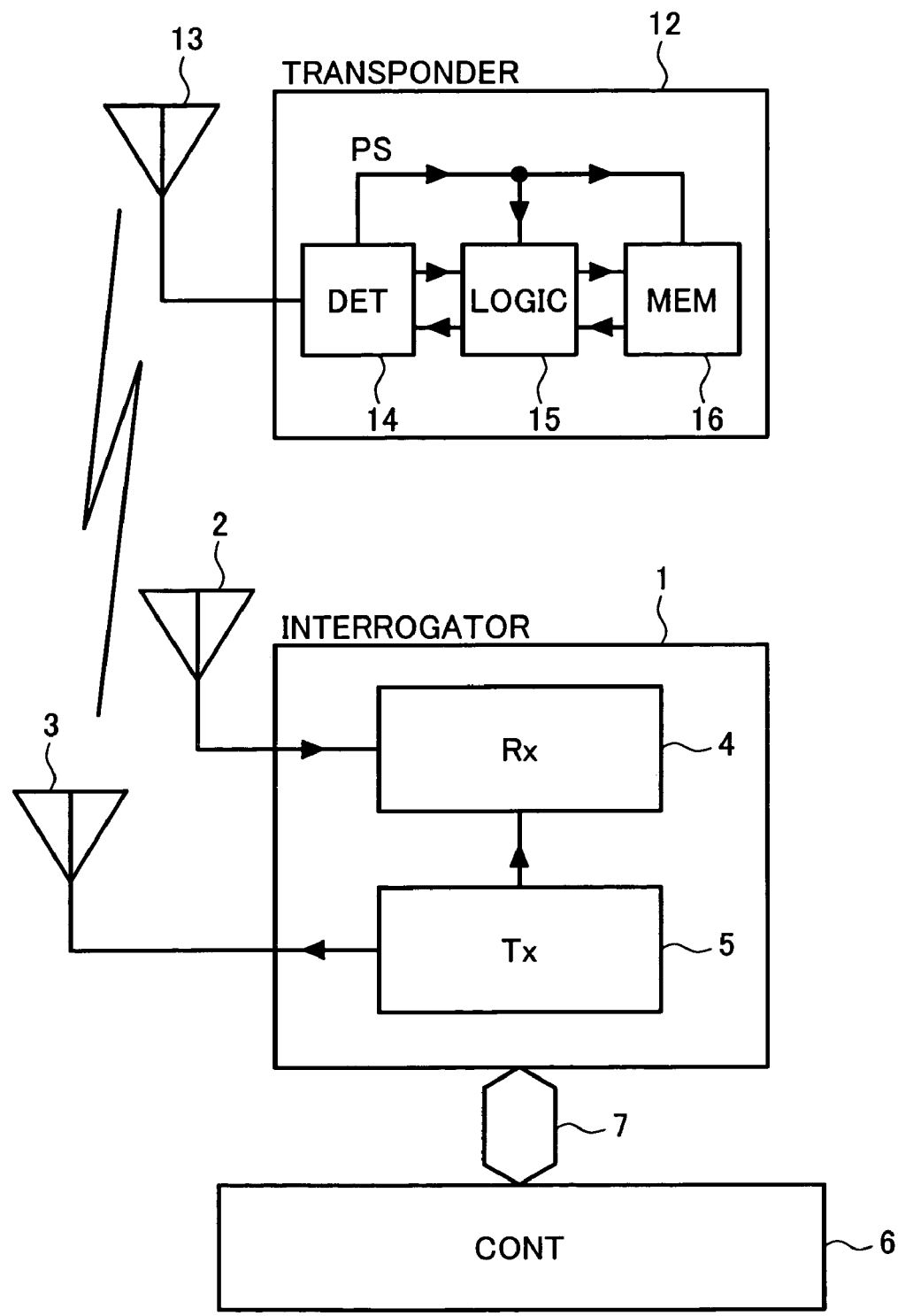
FIG. 8 is a block diagram for explaining a general example of a conventional RFID system.

FIG. 7 schematically shows a partial structure of each of the interrogator 41 according to the fifth embodiment, the interrogator 47 according to the sixth embodiment and the mobile phone 22 according to the sixth embodiment. In FIG. 7, a reference numeral 54 denotes a schematic illustration of an example of structure of the mobile phone 22, 55 of the antenna 23, 56 of the interrogators 41 and 47, 57 of the antenna 45, and 58 of the antenna 46.

Part (a) of FIG. 7 is a schematic view of the interrogator 56, showing the antennas 57 and 58. Part (b) of FIG. 7 is a schematic view of the mobile phone 54 attached with the interrogator 56 shown in Part (a). Part (c) of FIG. 7 shows an example of structure of the antenna 55 of the mobile phone 54 and the antenna 57 of the interrogator 56 in a case in which they are arranged in close proximity to each other.

The attachment-type interrogator 56 internally has the interrogator circuit of the fifth or the sixth embodiment and can be fitted, like a cap, on top of the mobile phone 54 equipped with the antenna 55. The antenna 55 that is a coil accommodated in a rod-like form of the mobile phone 54 is inserted in the antenna 57 having a cylindrical structure with a built-in antenna coil, the two antennas coming into close contact with each other.

The antenna 58 is for communicating with a transponder. The transponder obtains a power supply from the radio frequency power of radio waves radiated from the antenna 58. Additionally, the transponder can obtain a power supply also from the radio frequency power of radio waves radiated from the antenna 55 of the mobile phone 54 so that it is possible to extend the communication distance between the interrogator and the transponder.

Data obtained by the interrogator 56 from the transponder or information that the interrogator 56 supplies to the transponder can be transmitted from the mobile phone 54 to the outside via an interface of the mobile phone 54 such as a wired, radio or infrared interface. The arrangement shown in FIG. 7 includes the mobile phone 54 as an example, but a similar arrangement is possible using a different type of handy communication equipment.

The interrogator circuitries described for the first through the sixth embodiments are for use in combination with the mobile phone 22. It is possible to adapt such circuitries to make them usable in combination with a general handy communication device or a stationary communication device to enable using a smaller and less expensive interrogator.

According to the present invention, incorporating the circuit structures of the present invention in a mobile phone, a handy communication device or a stationary communication device allows interrogator circuits to be made more compact thereby making it possible to configure an interrogator which is not only inexpensive but smaller and lighter for an RFID system. In addition, since a high radio-frequency power of the communication device can be utilized, it is possible to extend the distance between the interrogator and the transponder.

INDUSTRIAL APPLICABILITY

As described above, the present invention can be suitably applied to an interrogator which, together with plural transponders, make up an RFID system. It is particularly suitable for an inexpensive interrogator required to be handy and easy to use.

The invention claimed is:

1. An interrogator which, together with a transponder, makes up a radio frequency identification system, comprising:
    a first antenna, provided for a portable wireless terminal, for radiating radio waves of a first radio frequency transmitter signal;
    a second antenna for receiving the radio waves radiated from the first antenna and outputting the first radio frequency transmitter signal;
    a divider for dividing the first radio frequency transmitter signal outputted by the second antenna;
    a rectifier for rectifying one of the first radio frequency transmitter signals outputted by the divider and outputting a power supply;
    an ASK (Amplitude Shift Keying) modulation circuit for performing amplitude modulation on the other of the first radio frequency transmitter signals outputted by the divider by information to be transmitted to the transponder and outputting the amplitude-modulated signal as a second radio frequency transmitter signal;
    a third antenna for radiating the second radio frequency transmitter signal outputted by the ASK modulation circuit; and
    a mixer for performing synchronous detection on a radio frequency receiver signal returned from the transponder which received said second radio frequency transmitter signal via the third antenna by using part of the second radio frequency transmitter signal as a carrier, and outputting data from the transponder.

2. The interrogator according to claim 1, further comprising:
    a coupler for extracting the part of the second radio frequency transmitter signal by coupling to the second radio frequency transmitter signal outputted by the ASK modulation circuit; and
    a circulator which, being positioned between the coupler and the third antenna, extracts the radio frequency receiver signal outputted by the third antenna discretely from the second radio frequency transmitter signal being sent to the third antenna and supplies the radio frequency receiver signal thus extracted to the mixer for performing synchronous detection.

3. The interrogator according to claim 2, wherein at least the second antenna, the third antenna, the divider, the rectifier, the ASK modulation circuit, the mixer, the coupler and the circulator are formed in a unitary structure.

4. The interrogator according to claim 2, wherein the information to be transmitted to the transponder and the transponder data outputted by the mixer are supplied to the portable wireless terminal as data to be processed by the portable wireless terminal.

5. The interrogator according to claim 1, wherein the second antenna has a cylindrical structure with a built-in antenna coil and an internal diameter of the second antenna is such that the first antenna is insertable in the second antenna to come into close contact with the second antenna.

6. An interrogator which, together with a transponder, makes up a radio frequency identification system, comprising:
    a first antenna provided for a portable wireless terminal for radiating radio waves of a first radio frequency transmitter signal;
    a second antenna for receiving the radio waves radiated from the first antenna and outputting the first radio frequency transmitter signal;

a rectifier for rectifying the first radio frequency transmitter signal outputted by the second antenna and outputting a power supply;

an oscillator circuit for generating a signal of a particular frequency;

an ASK (Amplitude Shift Keying) modulation circuit for performing amplitude modulation on the signal of the particular frequency outputted by the oscillator circuit by information to be transmitted to the transponder and outputting the amplitude-modulated signal as a second radio frequency transmitter signal;

a third antenna for radiating the second radio frequency transmitter signal outputted by the ASK modulation circuit;

a mixer for performing synchronous detection on a radio frequency receiver signal returned from the transponder which received said second radio frequency transmitter signal via the third antenna by using part of the second radio frequency transmitter signal as a carrier, and outputting data from the transponder;

a coupler for extracting the part of the second radio frequency transmitter signal by coupling to the second radio frequency transmitter signal outputted by the ASK modulation circuit; and a circulator which, being positioned between the coupler and the third antenna, extracts the radio frequency receiver signal outputted by the third antenna discretely from the second radio frequency transmitter signal being sent to the third antenna and supplies the radio frequency receiver signal thus extracted to the mixer for performing synchronous detection;

wherein at least the second antenna, the third antenna, the rectifier, the oscillator circuit, the ASK modulation circuit, the mixer, the coupler and the circulator are formed in a unitary structure.

7. The interrogator according to claim 6, wherein the information to be transmitted to the transponder and the transponder data outputted by the mixer are supplied to the portable wireless terminal as data to be processed by the portable wireless terminal.

8. The interrogator according to claim 6, wherein the particular frequency of the signal is approximately equal to or higher than the frequency of the first radio frequency transmitter signal of the portable wireless terminal.

9. The interrogator according to claim 6, wherein the second antenna has a cylindrical structure with a built-in antenna coil and an internal diameter of the second antenna is such that the first antenna is insertable in the second antenna to come into close contact with the second antenna.

* * * * *